June 26, 1951          E. G. BRUECKMAN          2,558,418
BOAT LAUNCHING AND LOADING TRAILER
Filed March 24, 1948          2 Sheets—Sheet 1
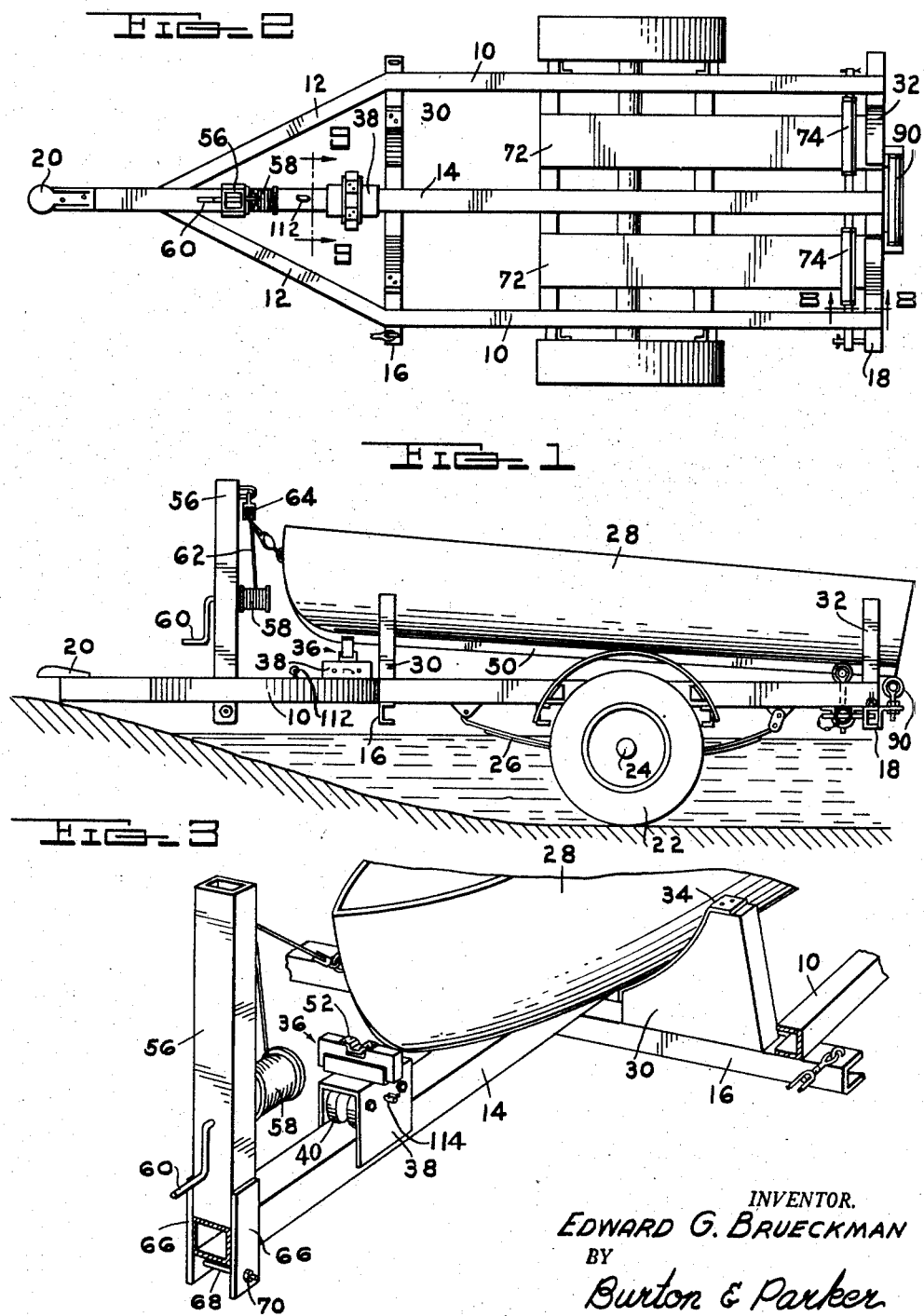
INVENTOR.
EDWARD G. BRUECKMAN
BY
Burton & Parker
ATTORNEYS June 26, 1951 E. G. BRUECKMAN 2,558,418
BOAT LAUNCHING AND LOADING TRAILER
Filed March 24, 1948 2 Sheets-Sheet 2
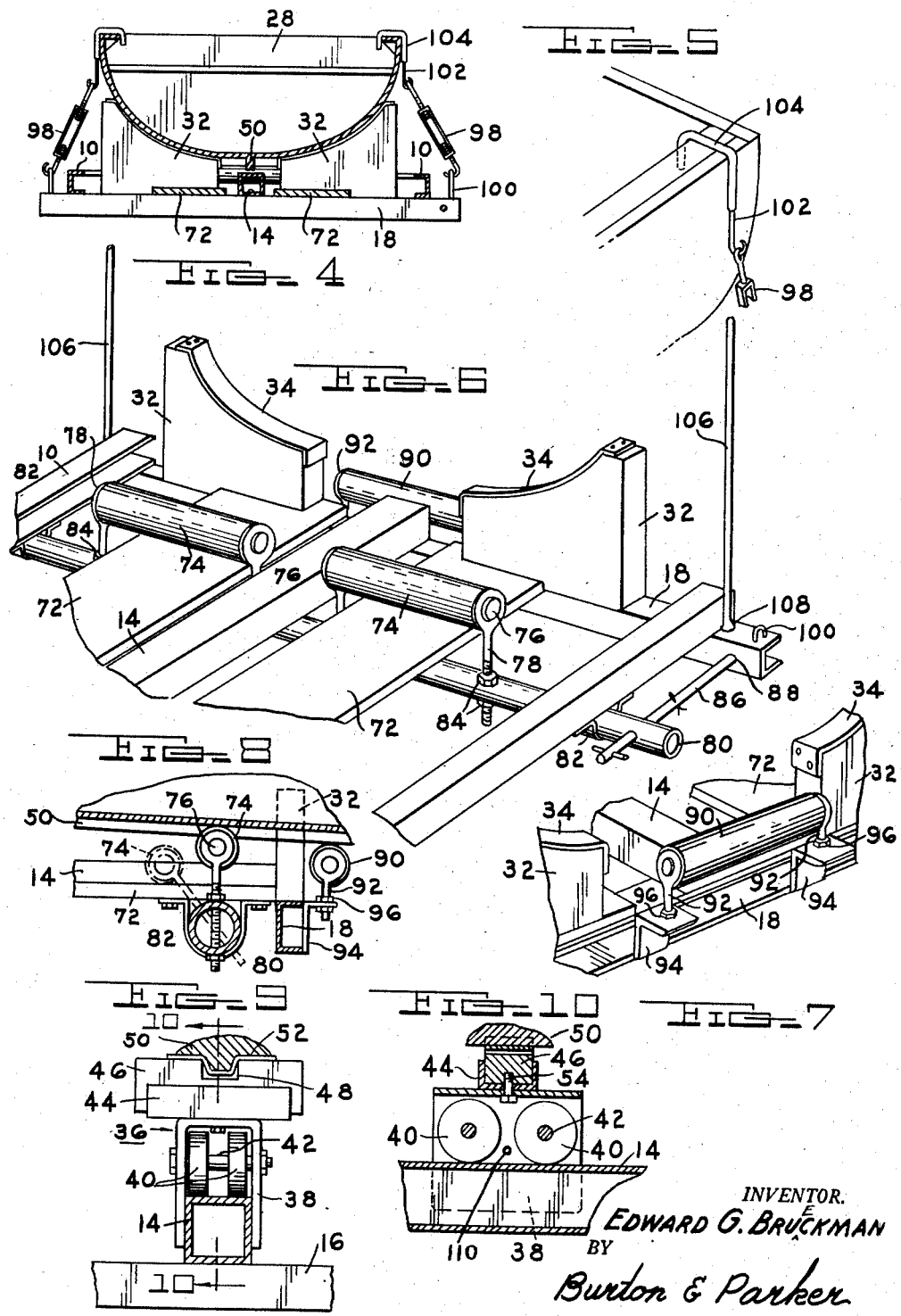
INVENTOR.
EDWARD G. BRUCKMAN
BY
Burton & Parker
ATTORNEYS Patented June 26, 1951

2,558,418

UNITED STATES PATENT OFFICE 2,558,418

BOAT LAUNCHING AND LOADING TRAILER

Edward G. Brueckman, Detroit, Mich.

Application March 24, 1948, Serial No. 16,734

13 Claims. (Cl. 214—65)

This invention relates to a trailer and particularly to improvements in a boat hauling, launching and loading trailer.

An important object of this invention is to provide an improved boat hauling, launching and loading trailer which is particularly adapted for operation by one person and which is capable of quickly and easily launching and loading boats. Another important object of this invention is to provide a trailer of this character which is rugged in construction and composed of parts of inexpensive manufacture. A further important object of the invention is to provide a trailer of this character which is especially adaptable for transporting, launching and loading relatively small boats and which can be safely and conveniently towed behind a motor vehicle.

In carrying out the invention, the trailer body is preferably supported from the ground by a single pair of road engaging wheels. The frame forming the major structural part of the trailer body is provided with a single central longitudinally extending member or guide rail upon which is mounted a keel engaging carirage or dolly of improved construction. Located forwardly and rearwardly of the frame are two boat supporting cradles each divided into two sections on opposite sides of the guide rail such that the keel engaging dolly may travel therethrough from substantially one end to the other end of the trailer. On the forward end of the frame is an upright post carrying a winch which is constructed for novel adjustable mounting on the guide rail. At the rear end of the frame are boat engaging rollers, preferably three in number, one of which engages the keel of the boat when launched or loaded and also serves as a stop assisting in holding the boat in place on the trailer, and the other two of which are arranged in a novel manner for simultaneous vertical adjustment relative to the frame to take the load of the boat from the rear cradle during the launching and loading operation. An important feature of the invention is the provision of standing platforms for the operator below each vertically adjustable roller and the provision of novel means for simultaneously raising and lowering the two adjustable rollers relative to the platforms and for releasably locking the same in raised boat engaging position.

Various other objects, advantages and meritorious features will become more fully apparent from the following specification, appended claims and accompanying drawings wherein:

Fig. 1 is a side elevation of the trailer showing a boat in launching position thereon, Fig. 2 is a top plan view of the trailer with the boat removed, Fig. 3 is a perspective view of the front end of the trailer showing a boat cradled thereon, Fig. 4 is a vertical sectional view of the trailer and a boat taken along line 4—4 of Fig. 1 but showing the boat supported on the cradles in transporting position, Fig. 5 is a fragmentary perspective view of the boat showing one of the hold-down means therefore, Fig. 6 is a perspective view of the rear end of the trailer showing the adjustable boat engaging rollers in raised operating position, Fig. 7 is a back end perspective view of the trailer showing the adjustable mounting of the keel engaging roller.

Fig. 8 is a detail sectional view taken along line 8—8 of Fig. 2,

Fig. 9 is a detail sectional view taken along line 9—9 of Fig. 2, and

Fig. 10 is a sectional view taken along line 10—10 of Fig. 9.

In the illustrated embodiment of the invention, the trailer comprises a body or frame composed of spaced apart side members 10—10 having their forward end sections 12—12 bent so as to converge together for connection to a central longitudinal member 14 extending the length of the trailer. The side members are preferably inwardly facing channel shaped bars whereas the central longitudinal member is preferably hollow and rectangular or square shaped in cross section as shown in Figs. 3 and 4. The side bars 10—10 are joined by a cross bar 16 adjacent the front end and a cross bar 18 at the rear end of the frame. The central longitudinal member 14 projects forwardly beyond the converging ends of the side bar sections 12—12 and is provided on its front end with any suitable means 20 for coupling the trailer to the rear of a motor vehicle. A set of wheels 22—22 are mounted on an axle 24 located closer to the rear end of the trailer than the front end which supports the trailer body from the ground by the conventional spring suspension 26.

The cross bars 16 and 18 are secured to the underside of the side bars 10—10 and extend under central longitudinal member 14 to assist in supporting the same. The connection of the various members of the frame may be by welding or otherwise to form the frame into a rigid structural unit. Supported on the cross bars are cradles upon which a boat such as that indicated at 28 may be supported for transportation and storage. Each cradle is divided into two sections spaced apart transversely of the frame on opposite sides of the central member 14. The two sections of the front cradle are indicated at 30—30 and the two sections of the rear cradle are referred to by reference numerals 32—32. The upper edge of each cradle is arcuately shaped to conform to the bottom of the boat and as customary a padding 34 of rubber or the like may line the upper edge to prevent damage to the boat. An important feature of the invention is the spaced relation of the two sections of each cradle from the central member as shown in Figs. 2 and 6 which leaves the latter unobstructed throughout its full length for the purpose described hereinafter.

The central longitudinal member 14 in addition to serving as a structural part of the frame and a towing reach also serves as a guide rail for a traveling boat supporting carrier. As shown in Figs. 1 and 2 and particularly in Figs. 9 and 10 there is mounted on the rail member 14 a carriage or dolly generally indicated at 36 which is capable of traveling substantially the entire length of the trailer and between the spaced sections of the two cradles. The dolly comprises an inverted U-shaped frame member 38 adapted when mounted on the rail to straddle the same. Within the frame member 38 are two pairs of rollers or wheels 40 each journaled on a cross stub shaft 42 supported by the side arms of the U-shaped member. Superimposed on the closed end of the frame member is an upwardly opening channel shaped member 44 in which is mounted a block 46 indented or grooved transversely as at 48 to receive the keel 50 of the boat. Across the keel receiving groove 48 is stretched a flexible member 52 of rubber or the like with which the keel 50 is directly engageable.

A feature of the dolly is the provision for rotating the block 46 relative to the U-shaped frame member 38. A single pin or bolt 54 extends upwardly through the closed end of the frame member and the base of the channel member 44 and into block 46. This pin serves to connect these elements together as well as to permit the block 46 to swing about a vertical axis. Quite frequently when launching the boat onto water or loading the same on the trailer therefrom the stern end of the boat swings with the current and the provision for turning the block 46 enables the groove 48 to align itself with the direction of the keel as the latter slides in the groove thereby preventing any binding or friction between the keel and dolly.

Mounted on the forward end of the central member 14 is an upright post 56 carrying a winch 58 with which is associated an operating crank handle 60. A cable 62 wound on the winch is passed over a pulley 64 loosely connected to the upper end of the post and the free end of the cable is attachable to an eye on the bow of the boat. The cable when payed out is connected to the boat to be loaded onto the trailer and when the cable is shortened by winding in the cable on the winch the boat is pulled inwardly over the rear end of the trailer. The base of the post 56 is adjustably mounted on the guide rail member 14 for adjustment in a fore and aft direction of the trailer. This is accomplished in the illustrated embodiment of the invention by the provision of two side plates 66—66 secured to the lower end of the opposite sides of the post and arranged to project downwardly therefrom in straddling relation to the rail member 14 in the manner shown in Fig. 3. The lower ends of these plates depend below the rail member and are connected together by a cross bolt 68 which when the nut 70 thereon is tightened will tightly clamp the post in adjusted position. The adjustment of the post will enable the trailer to accommodate boats of different lengths. The post can be removed from the rail member by simply removing the bolt 68 and the post may be re- mounted on the rail member near the rear end thereof if it is desirable to use the winch and cable from that end of the trailer.

Adjacent to the rear end of the trailer body are two platforms 72—72 located on opposite sides of the rail member 14 and in spaced relationship thereto in order that the dolly may travel therebetween. These platforms are intended for the operator to stand upon when either launching or pulling a boat upon the trailer. Extending transversely across each platform is a roller 74—74. These rollers are mounted for adjustment in a vertical direction to engage the underside of the boat and are therefore preferably sheathed by a flexible body such as rubber. The rollers 74 are each journaled on a shaft 76 which as shown in Fig. 6 have their opposite ends supported by arms 78—78 from a cross bar 80. The latter is preferably of hollow cylindrical formation and extends under the side bars 10—10 and under the platforms 72—72 and is journaled for rotation on the trailer body. The journal mounting is preferably a U-shaped bracket 82 attached to the underside of the side bars 10—10 as shown in Figs. 6 and 8. The arms 78—78 of each roller extend through the cross bar 80 and are externally threaded so that nuts 84—84 on each arm may be threadedly adjusted to vary the height of the roller relative to the bar. This adjustment is for the purpose of initially varying the position of the rollers for the size of the boat to be accommodated on the trailer. Once the boat has been selected for use on this trailer and the adjustment of the arms therefor has been made, there will not be any need for further adjustment thereof.

As shown by comparison of the full line and dotted line showings of the rollers and arms in Fig. 8, it is possible by rotating the cross bar 80 to swing the rollers 74—74 from a retracted position substantially abutting the platforms 72—72 to a raised position in which they engage the underside of the boat on opposite sides of the keel and lift the boat so as to take the load thereof from the rear cradle sections 32—32. To rotate the cross bar 80, it is preferred to mount a handle on at least one projecting end of the bar so that the latter may be rotated from at least one side of the trailer. The handle is preferably a rod 86 slidable transversely in the cross bar 80. Means is provided for releasably locking the rollers 74—74 in their raised boat engaging position. This is preferably accomplished by providing an aperture or hole 88 in the end of the cross frame member 18 through which the handle rod 86 may slidably enter as shown in Fig. 6. When thus inserted, the handle rod 86 holds the cross bar 80 and the rollers 74—74 from movement. When it is desired to lower the rollers, the handle rod 86 is slidably retracted from the hole 88 and thereafter the handle may be rotated in a counterclockwise direction so as to retract the rollers to the dotted position shown in Fig. 8.

Mounted on the back end of the trailer immediately adjacent to the rear end of the rail member 14 is a roller 90 which is constructed similarly to the rollers 74—74. This roller is supported as shown in Fig. 7 by two arms 92—92 which are passed through horizontal sections of L-shaped brackets 94—94 secured to the rear side of the rear cross frame member 18. As in the case of the arms 78—78, the arms 92—92 are externally threaded and are provided with nuts 96—96 both on the top and the bottom side of the bracket so as to adjustably hold the roller 90 in any desired vertical position relative to the rail member 14. Preferably, as shown in Fig. 1, it is desired to mount the roller 90 at a height slightly above that of the guide rail 14 so that when the boat is fully received and supported within the cradles 30 and 32 the rear end of the keel will abut the roller 90 and be held thereby from translational movement. In this manner, when the boat is fully loaded on the trailer the roller 90 serves as a stop preventing rearward movement of the boat.

The height of the roller 90 is preferably adjusted with respect to the rollers 74—74 that when the latter are swung to their raised position the boat will be lifted thereby so as to carry the keel thereof to a height equal to or slightly over the roller 90. Thus, when the hold down devices securing the boat to the cradles are removed, the single movement of the handle 86 controlling the rollers 74—74 will raise the boat from the rear cradle 32 and place it in position so that the keel thereof may ride over the roller 90. The handle may thereafter be locked with the rollers in raised position while the operator assumes other positions in the launching or loading operations.

The hold down devices previously mentioned may be of any desired construction such as the turnbuckle assemblies indicated at 98 in Figs. 4 and 5. One end of the turnbuckle may be secured to the eyes 100 on the projecting ends of the cross frame members 16 and 18 and the other end of the turnbuckles may be connected to U-shaped clamping members 102 covered by yieldable sheathing 104 which are engageable over the gunwales of the boat in the manner shown in Figs. 4 and 5.

Usually when launching or loading a boat the rear end of the trailer is partially immersed in the body of water causing the stern end of the boat when free of the hold-down devices to float above the cradles. If there is a current in the water or a wind present the stern end of the boat is likely to swing relative to the dolly 37 and the trailer. To prevent too great swinging movement of the stern under such circumstances it is preferred to employ two upright guide posts or rods 106—106 each removably mounted upon an opposite end of the rear cross member 18 as shown in Fig. 6. These posts project to a considerable height above the cradle sections 32—32 and if the boat's stern should float clear thereof and swing in either direction it will abut either one of the posts 106 and be held from swinging beyond the side of the trailer. The lower ends of the vertical posts 106 are slidably receivable in aligned holes in the horizontal flange portions of the cross member 18. To prevent the posts from completely sliding therethrough and to hold them at the desired height any suitable means may be employed. For this purpose, the posts may be swaged or flattened in one plane adjacent to their lower ends as shown at 108 in Fig. 6, making them wider at this point than the aligned holes in the cross member. Cotter pins or other removable securing means may be fitted to the lower projecting ends of the posts to prevent unintentional removal thereof.

When launching or loading a boat, the carriage or dolly 36 is slid under the bow end of the boat bringing the keel thereof into the rubber lined groove 48. Fig. 1 illustrates a boat in position on the trailer to be launched. The front end of the boat has been raised by the winch off of the front cradle sections 30—30 and the dolly 36 has been positioned under the forward end of the keel 50. The vertically adjustable rollers 74—74 have been lifted to boat engaging position and locked in this position by the slidable fitting of the handle 86 into the hole 88 of the rear cross member 18. This brings the rear end of the keel 50 up to at least the level of the roller 90 in position to slide thereover. Thereafter, the boat is pushed rearwardly from the trailer, the dolly continuing to engage the bow end of the keel and moving therewith to the rear end of the guide rail 14. The swiveled upper part of the dolly enables the stern end of the boat to swing sideways without binding the boat on the dolly or the dolly on the guide rail. The dolly travels the length of the guide rail between the split sections of the front and rear cradles and between the two platforms 72—72 and holds the bow of the boat on the centerline of the trailer throughout this movement.

The boat loading procedure is the reverse of the launching operation. The bow of the boat as it rides over the rear roller 90 is supported upon the dolly. By use of the winch the boat and the dolly travel forwardly on the guide rail, and as this occurs the opposite side portions of the bottom roll over the rollers 74—74 until the boat assumes substantially the position shown in Fig. 1. The bow end may then be raised by the winch and the dolly shifted forward to the position shown in Fig. 3. Thereafter the winch may be operated to lower the bow end of the boat on the front cradle and the handle 86 turned to retract the rollers 74—74 and lower the stern end of the boat on the rear cradle. This will bring the rear end of the keel below the level of the roller 90 when the latter will act as a stop preventing rearward movement of the boat. The clamps 102—104 may then be used to secure the boat firmly to the cradles. The construction and relation of the parts of the trailer are such that one man may easily perform either the launching or loading operation.

When the boat is fully cradled, the dolly 36 is shifted forwardly on the guide rail and may be locked against movement thereon by any suitable means. For this purpose a pair of aligned holes 110 (Fig. 10) are formed in the side plates of the inverted U-shaped member 38. The two holes are located above the level of the guide rail and between the front and rear set of wheels 40—40. Through these holes a bolt 114 is slidably receivable as shown in Fig. 3. Carried centrally on the upper surface of the guide rail 14 is a hook 112 which opens rearwardly as shown in Fig. 1. The hook is arranged on the level with the holes 110 so that when the dolly is adjusted over the hook the bolt 114 may slide through the holes and the hook to secure the dolly against longitudinal movement. Any suitable releasable means may be provided on the projecting end of the bolt to prevent accidental return movement thereof. In this position of the parts both the trailer and the boat may be conveniently transported and stored.

There is thus provided as a result of this invention a one-man operating trailer including a central longitudinally extending guide rail, a traveling keel engaging carriage or dolly thereon, cradles for supporting the boat when loaded on the trailer, and adjustable roller means for partially taking the load of the boat to assist in loading and launching the same. Also as a result of this invention, a single keel engaging dolly is capable of movement from substantially one end of the trailer to the opposite end and of passing between both cradles during the operations of launching or loading the boat. The dolly is provided with a swiveling keel engaging member which enables the dolly to align itself with the direction of the keel in the event the boat should swing during the loading and launching operations. The winch including the cable associated therewith is capable of bodily adjustment fore and aft on the trailer so that it may accommodate boats of different sizes and also so that it may be used adjacent to the rear end of the trailer for any use the operator may desire.

What I claim is:

1. In a trailer adapted to carry a boat, a frame including a central longitudinal member, a winch supported by the frame on one end of the member, a roller, means mounting the roller on the frame adjacent to the other end of the member for vertical movement such that in its raised position the roller will engage the keel portion of a boat on the trailer, and a keel engaging carriage mounted on the member for travel therealong from one end to the other end thereof.

2. In a trailer adapted to carry a boat, a frame including front and rear boat receiving cradles and a central longitudinal member extending substantially the length of the trailer, a keel engaging carriage mounted on said member for travel therealong from one end to the other end thereof, a pair of rollers located adjacent to the rear cradle of the trailer and on opposite sides of the member, and means adjustably mounting said rollers on the frame for vertical movement such that in a raised position the rollers will engage the keel portion of a boat and take the load thereof from the rear cradle.

3. In a trailer adapted to carry a boat, a frame including front and rear boat receiving and supporting cradles and a central longitudinal extending member running substantially the length of the trailer, a keel engaging dolly mounted on said member for travel therealong from one end to the other end thereof, an upright post carrying a winch, means mounting the upright post on the forward end section of the member for longitudinal adjustment thereon, a pair of rollers located adjacent to the rear cradle and on opposite sides of the member, means adjustably mounting said rollers on the frame for vertical movement such that in their raised position the rollers will engage the bottom of a boat on opposite sides of the keel thereof and take the load of the boat from the rear cradle, and control means for simultaneously raising and lowering said pair of rollers.

4. A boat launching and loading trailer comprising, in combination, a wheel supported frame including a central longitudinal member, a keel engaging dolly mounted on said member for travel therealong, a roller rotatably journaled on the rear end of the frame immediately beyond the rear end of said member and extending transversely of the trailer and at a height slightly above that of the member, a pair of rollers located adjacent to the rear end of the frame but forwardly of said first mentioned roller and disposed on opposite sides of the member, means adjustably mounting said pair of rollers on the frame for vertical movement such that in their raised position the pair of rollers engage the keel portions of the boat mounted on the trailer and take the load thereof, and control means including an operating handle at one side of the trailer for simultaneously raising and lowering said pair of rollers.

5. A boat launching and loading trailer comprising, in combination, a frame including front and rear boat receiving and supporting cradles and a central longitudinal member extending substantially the length of the trailer, a roller fixed to the frame and extending transversely thereof immediately beyond the rear end of said member and to a height slightly thereabove, a pair of rollers located adjacent to the rear cradle but forwardly thereof and on opposite sides of the member, means mounting said pair of rollers for vertical movement such that in their raised position they will engage the bottom portion of a boat supported on the rear cradle and take the load thereof, control means including an operating handle at one side of the frame for simultaneously raising and lowering said pair of rollers, and means for releasably locking said pair of rollers in their raised position.

6. A boat launching and loading trailer comprising, in combination, a front boat receiving cradle mounted on the frame and formed of two correspondingly shaped sections spaced apart from one another transversely of the frame, a rear boat receiving cradle mounted on the frame and similarly formed of two correspondingly shaped sections spaced apart from one another transversely of the frame, a central longitudinal member on the frame extending substantially the length thereof and between the spaced sections of the front and rear cradles, said member being unobstructed throughout its length to form a guiding rail, and a keel engaging carriage mounted on said rail member for travel thereon from substantially one end to the other end thereof and between the spaced sections of the front and rear cradles.

7. A boat launching and loading trailer comprising, in combination, a frame having a central longitudinal member forming a guiding rail, a front boat receiving cradle mounted on the frame and divided into two sections disposed on opposite sides of the rail member, a similar rear boat receiving cradle mounted on the frame and divided into two sections disposed on opposite sides of the rail member, a keel engaging dolly including an inverted U-shaped member straddling the rail member and provided with wheels interposed between the frame member and the rail member and bearing on the latter to provide substantially frictionless movement of the dolly along the rail member, said rail member being unobstructed throughout its length such that the dolly may travel substantially the length thereof and between the sections of the front and rear cradles.

8. A boat launching and loading trailer comprising, in combination, a frame, a front boat receiving cradle mounted on the frame and formed of two correspondingly shaped sections spaced apart from one another, a rear boat receiving cradle mounted on the frame and similarly formed of two correspondingly shaped sections spaced apart from one another, a central longitudinally extending rail running substantially the length of the frame and between the spaced sections of the front and rear cradles, a keel engaging dolly mounted on said rail for travel therealong from substantially one end to the other end thereof and between the spaced sections of the front and rear cradles, a standing platform on the frame on each side of the rail for supporting an operator thereon, a roller extending transversely across the upper side of each platform, means mounting each of said rollers on the frame for vertical adjustment such that in their raised positions they will engage the bottom of a boat supported on the cradles and partially take the load thereof, and control means including a handle at one side of the frame for simultaneously raising and lowering said rollers relative to the platforms.

9. In a boat launching and loading trailer, a frame, a pair of platforms upon which an operator may stand extending longitudinally of the frame on opposite sides of the longitudinal median line thereof, a roller extending transversely across the upper side of each platform, means mounting each of said rollers on the frame for vertical adjustment such that in their raised positions they will engage the bottom of a boat carried on the trailer and partially take the load thereof, and control means including a handle at one side of the frame for simultaneously raising and lowering said rollers relative to the platforms.

10. In a boat launching and loading trailer, a frame, a pair of platforms upon which an operator may stand extending longitudinally of the frame on opposite sides of the longitudinal median line thereof, a roller extending transversely across the upper side of each platform, a rotatable bar extending transversely of the frame and under said platforms, and means connecting the ends of the said rollers to the bar such that upon rotation of the latter the rollers will swing in an arcuate path from a level adjacent to the upper side of the platforms to a raised position thereabove for engaging the underside of a boat carried upon the trailer.

11. A boat launching and loading trailer comprising, in combination, a frame including a central longitudinally extending rail and a front and a rear cradle each divided into two sections disposed transversely of the frame on opposite sides of the rail, a keel engaging carriage mounted on the rail for travel therealong and between the sections of the front and rear cradles, an upright post carrying a winch, means mounting the base of the post on the forward end section of the rail for longitudinal adjustment, a roller fixed to the frame immediately beyond the rear end of the rail and extending transversely thereof at a height slightly above that of the rail, a pair of longitudinally extending platforms carried by the frame on opposite sides of the rail forwardly of the rear cradle, a roller extending transversely across the upper side of each of said platforms, a bar extending transversely of the frame under the platforms and journaled for rotation in the frame, means connecting each platform associated roller to the bar such that upon rotation of the latter in one direction the rollers will swing simultaneously upwardly and engage the underside of a boat supported on the cradles, a handle on one end of said bar for rotating the same, and means associated with the frame for engaging and locking the handle against movement when the rollers operatively associated therewith are swung to said boat engaging positions.

12. In a boat launching and loading trailer, means for guiding a boat on to and off of the trailer, a pair of rollers located on the opposite sides of the center line of the trailer and having their axes extending transversely of the trailer, means adjustably mounting said pair of rollers on the trailer for vertical movement such that in their raised position the pair of rollers will engage the bottom portion of a boat mounted on the trailer and partially take the load thereof, and conrol means including an operating handle for simultaneously raising and lowering said pair of rollers.

13. In a boat launching and loading trailer, a wheel supported frame and means for guiding a boat on to and off of the frame, a boat receiving cradle mounted on the frame, a roller located adjacent to the cradle, means adjustably mounting said roller on the frame for vertical movement such that in its raised position it will engage the keel portion of a boat resting on the cradle and partially take the load thereof, and control means for raising and lowering said rollers.

EDWARD G. BRUECKMAN.

REFERENCES CITED

The following references are of record in the file of this patent:

UNITED STATES PATENTS

| Number | Name | Date |
|---|---|---|
| 2,219,401 | Sampsell | Oct. 29, 1940 |
| 2,389,338 | Zorc | Nov. 20, 1945 |

FOREIGN PATENTS

| Number | Country | Date |
|---|---|---|
| 284,419 | Great Britain | Feb. 2, 1928 |
| 496,549 | Great Britain | Nov. 28, 1938 |